United States Patent
Murakami et al.

(10) Patent No.: US 11,216,018 B2
(45) Date of Patent: Jan. 4, 2022

(54) VALVE DEVICE

(71) Applicant: SHOWA CORPORATION, Gyoda (JP)

(72) Inventors: Yosuke Murakami, Fukuroi (JP); Yosuke Fujikawa, Fukuroi (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/078,854

(22) Filed: Oct. 23, 2020

(65) Prior Publication Data

US 2021/0041899 A1 Feb. 11, 2021

Related U.S. Application Data

(63) Continuation of application No. PCT/JP2019/027683, filed on Jul. 12, 2019, which is a continuation-in-part of application No. PCT/JP2018/026680, filed on Jul. 17, 2018.

(51) Int. Cl.
*F16K 31/04* (2006.01)
*G05D 16/20* (2006.01)

(52) U.S. Cl.
CPC ....... *G05D 16/2093* (2013.01); *F16K 31/047* (2013.01); *F16K 2200/3051* (2021.08)

(58) Field of Classification Search
CPC .... F16K 31/047; F16K 31/0665; F16K 31/10; F16K 2200/305; F16K 2200/3051; G05D 16/2093
USPC ............. 251/129.2, 242, 243, 244, 245, 246
See application file for complete search history.

(56) References Cited

U.S. PATENT DOCUMENTS

| | | | | |
|---|---|---|---|---|
| 1,967,418 A | * | 7/1934 | Mcphail | F16K 15/12 137/516.21 |
| 2,310,570 A | * | 2/1943 | Briggs | F16F 9/52 188/276 |
| 2,777,461 A | * | 1/1957 | Wildhaber | G01F 23/241 141/198 |

(Continued)

FOREIGN PATENT DOCUMENTS

| | | |
|---|---|---|
| JP | 53-017933 U | 2/1978 |
| JP | 03-107602 A | 5/1991 |

(Continued)

OTHER PUBLICATIONS

International Search Report dated Oct. 8, 2019 for the corresponding PCT International Application No. PCT/JP2019/027683.

(Continued)

*Primary Examiner* — William M McCalister
(74) *Attorney, Agent, or Firm* — Leason Ellis LLP

(57) ABSTRACT

A valve device includes an operating unit, a first pushing member, a plate-like member, a second pushing member, and a valve. The plate-like member includes a plurality of the moment arms arranged at intervals in a circumferential direction. A force point of each of the plurality of the moment arms is pushed by a front end of the first pushing member. The second pushing member has an acted surface receiving a force from an action point of each of the plurality of the moment arms. The plurality of the moment arms are integrally connected by an annular frame portion of the plate-like member where the fulcrum is disposed.

16 Claims, 11 Drawing Sheets

(56) References Cited

U.S. PATENT DOCUMENTS

| | | | | |
|---|---|---|---|---|
| 2,989,982 | A * | 6/1961 | Soderberg | G05D 16/0655 137/505.22 |
| 3,302,662 | A * | 2/1967 | Webb | F16K 15/046 137/539 |
| 3,690,460 | A * | 9/1972 | Lindboe | B01D 27/106 210/130 |
| 3,757,910 | A * | 9/1973 | Palmer | F16F 9/348 188/322.14 |
| 3,970,281 | A * | 7/1976 | Heeb | F16K 51/02 251/77 |
| 4,212,320 | A * | 7/1980 | Stoll | F16K 31/385 137/625.6 |
| 4,381,796 | A * | 5/1983 | Stockli | G05D 16/0641 137/224 |
| 4,540,354 | A * | 9/1985 | Tuckey | F04C 11/008 137/512.15 |
| 4,569,504 | A * | 2/1986 | Doyle | H01F 7/1638 251/129.15 |
| 4,955,582 | A * | 9/1990 | Baumann | F16K 7/123 251/331 |
| 5,211,341 | A * | 5/1993 | Wieczorek | F02M 51/065 239/585.3 |
| 5,211,372 | A * | 5/1993 | Smith, Jr. | F01L 25/08 251/129.19 |
| 5,314,164 | A * | 5/1994 | Smith | F16K 31/0682 251/129.17 |
| 6,059,259 | A * | 5/2000 | Gregoire | F16K 7/14 251/331 |
| 6,213,448 | B1 * | 4/2001 | Hayakawa | F16K 1/36 251/129.15 |
| 6,547,214 | B2 * | 4/2003 | Gregoire | F16K 17/048 251/58 |
| 6,764,286 | B2 * | 7/2004 | Hunnicutt | B60T 8/4031 417/470 |
| 9,151,403 | B2 * | 10/2015 | Webster | F16K 31/1221 |
| 9,416,893 | B2 * | 8/2016 | Yakushijin | F16K 27/0236 |
| 2004/0061084 | A1 * | 4/2004 | Baumann | F16K 31/1262 251/58 |
| 2008/0054214 | A1 * | 3/2008 | Olberding | F16K 31/1262 251/242 |
| 2011/0315251 | A1 * | 12/2011 | Rampen | F16K 31/408 137/561 R |
| 2012/0012767 | A1 * | 1/2012 | Leiser | F16K 31/0689 251/129.01 |
| 2015/0323092 | A1 | 11/2015 | Yakushijin et al. | |
| 2016/0272271 | A1 | 9/2016 | Murakami | |
| 2016/0369862 | A1 | 12/2016 | Miwa et al. | |
| 2019/0219126 | A1 | 7/2019 | Miwa et al. | |

FOREIGN PATENT DOCUMENTS

| | | |
|---|---|---|
| JP | 03-117785 A | 5/1991 |
| JP | 2013-194758 A | 9/2013 |
| JP | 2016-175555 A | 10/2016 |
| JP | 2017-008970 A | 1/2017 |
| WO | WO-2014/010412 A1 | 1/2014 |

OTHER PUBLICATIONS

Written Opinion dated Oct. 8, 2019 for the corresponding PCT International Application No. PCT/JP2019/027683.

International Preliminary Report on patentability dated Mar. 2, 2020 for the corresponding PCT International Application No. PCT/JP2019/027683.

International Search Report dated Oct. 16, 2018 for the corresponding PCT International Application No. PCT/JP2018/026680.

Written Opinion dated Oct. 16, 2018 for the corresponding PCT International Application No. PCT/JP2018/026680.

\* cited by examiner

VALVE DEVICE

CROSS-REFERENCE TO RELATED APPLICATION(S)

This application is a continuation of PCT application No. PCT/JP2019/027683, which was filed on Jul. 12, 2019, which claims the benefit of priority to International Patent Application No. PCT/JP2018/026680 filed on Jul. 17, 2018, the contents of which are incorporated herein by reference in their entireties.

FIELD OF THE INVENTION

The present invention relates to a valve device capable of opening and closing by an operating unit including an operating rod capable of advancing and retracting.

BACKGROUND OF THE INVENTION

A valve device that opens and closes a valve using an operating unit includes a direct acting valve device that directly opens and closes the valve, and a pilot-type valve device that opens and closes a main circuit by driving a valve body using a fluid pressure difference. The direct acting valve device is disclosed in JP-A-2016-175555 (hereinafter, referred to as PTL 1), for example. The pilot type valve device is disclosed in JP-A-2017-008970 (hereinafter, referred to as PTL 2), for example.

The direct acting valve device disclosed in PTL 1 opens and closes the valve using a solenoid, which is a type of operating unit. When an exciting coil of a solenoid is not excited, the valve body closes a valve seat. A plunger of the solenoid generates an axial thrust by the supply of current to the exciting coil. An operating rod integrated with the plunger moves in an axial direction by the thrust of the plunger and pushes a push rod. The pushed push rod separates the valve body from the valve seat. As a result, the valve opens.

The pilot-type valve device disclosed in PTL 2 includes a pilot chamber that applies an internal pressure to a main valve in a valve closing direction, and a pilot valve that adjusts the internal pressure of the pilot chamber. That is, an operation of the valve has two stages.

However, in the direct acting valve device disclosed in PTL 1, since the solenoid is used to directly open and close the valve, it is necessary to use a relatively large solenoid and power consumption tends to increase. In particular, the larger a diameter of the valve become, the higher the tendency become.

Meanwhile, the pilot-type valve device disclosed in PTL 2 is capable of opening and closing a large valve with a small operating force. However, the structure of the valve device is complicated. Moreover, since the operation of the valve has two stages, it is necessary to consider a delay in responsiveness to the operation of opening and closing the valve.

An object of the present invention is to provide a valve device capable of opening and closing a large valve with a small operating force in a simple structure.

SUMMARY OF INVENTION

As a result of extensive investigations, the inventors of the present invention have found that by employing a mechanical booster mechanism utilizing the principle of "lever", it is possible to open and close a large valve with a small operating force. The present invention has been completed based on this finding.

Hereinafter, the present disclosure will be described. In the following description, reference numerals in the attached drawings are added in parenthesis in order to help easy understanding of the present disclosure, but the present invention is not limited to the depicted forms.

According to one aspect of the present disclosure, a valve device (10) includes:

an operating unit (20) including an operating rod (24) capable of advancing and retracting;

a first pushing member (30) capable of advancing in the same direction as the operating rod (24) by being pushed by the operating rod (24) that advances;

a plate-like member (50) including at least one moment arm (51) that extends in a direction intersecting an axial direction of the first pushing member (30), has a force point (P1) pushed by the first pushing member (30) at a first end (51a) which is an end on an axial center (CL) side of the first pushing member (30), has a fulcrum (P2) at a second end (51b) which is an end on a side different from the axial center (CL), and has an action point (P3) between the force point (P1) and the fulcrum (P2);

a second pushing member (60) capable of advancing in a same direction as the first pushing member (30) by receiving a force from the action point (P3) of the moment arm (51); and a valve (70) capable of opening and closing according to the advancing and retracting of the second pushing member (60), in which the plate-like member (50) includes a plurality of the moment arms (51) arranged at intervals in a circumferential direction, the force point (P1) of each of the plurality of the moment arms (51) is pushed by the front end (33) of the first pushing member (30), the second pushing member (60) has an acted surface (64) receiving a force from the action point (P3) of each of the plurality of the moment arms (51), and the plurality of the moment arms (51) are integrally connected by an annular frame portion (52) of the plate-like member (50), the fulcrum (P2) being disposed on the annular frame portion (52).

According to another aspect of the present disclosure, a valve device (10A) includes:

an operating unit (20) including an operating rod (24) capable of advancing and retracting;

a first pushing member (30) capable of advancing in the same direction as the operating rod (24) by being pushed by the operating rod (24) that advances;

a plate-like member (50) including at least one moment arm (51) that extends in a direction intersecting an axial direction of the first pushing member (30), has a force point (P1) pushed by the first pushing member (30) at a first end (51a) which is an end on an axial center (CL) side of the first pushing member (30), has a fulcrum (P2) at a second end (51b) which is an end on a side different from the axial center (CL), and has an action point (P3) between the force point (P1) and the fulcrum (P2);

a second pushing member (60) capable of advancing in a same direction as the first pushing member (30) by receiving a force from the action point (P3) of the moment arm (51);

a valve (70) capable of opening and closing according to the advancing and retracting of the second pushing member (60);

a storage chamber (77) accommodating the first pushing member (30), the plate-like member (50) and the second pushing member (60); and a check valve (80) that is opened when an internal pressure of the storage chamber (77) exceeds an external pressure.

In addition, the plate-like member (50) may include a plurality of the moment arms (51) arranged at intervals in a circumferential direction, the force point (P1) of each of the plurality of the moment arms (51) may be pushed by the front end (33) of the first pushing member (30), the second pushing member (60) may include an acted surface (64) receiving a force (W2) from the action point (P3) of each of the plurality of the moment arms (51), and the plurality of the moment arms (51) may be integrally connected by an annular frame portion (52) of the plate-like member (50), the fulcrum (P2) being disposed on the annular frame portion (52).

In addition, in the plate-like member (50), a width (Wd1) of a portion (54) where the frame portion (52) and the plurality of the moment arms (51) are connected may be narrower than a width (Wd2) of a portion (55) where the action point (P3) is disposed.

In addition, the plate-like member (50) may be an elastic body.

In addition, the operating unit (20) may be an electromagnetic solenoid.

The principle of "lever" can be adopted by using a moment arm having a fulcrum, a force point, and an action point. A mechanical booster mechanism that utilizes the principle of "lever" is adopted, so that a simple configuration without using a pilot valve can allow a large valve to be opened and closed with a small operating force. In addition, by using the check valve, the amount of air sucked in the pump can be further reduced. Accordingly, it is possible to provide a valve device capable of opening and closing a large valve with a small operating force in a simple structure.

DETAILED DESCRIPTION OF THE INVENTION

Embodiments of the present invention will be described below with reference to the accompanying drawings. The form depicted in the attached drawings is merely an example of the present invention, and the present invention is not limited thereto.

First Embodiment

Figure 1:
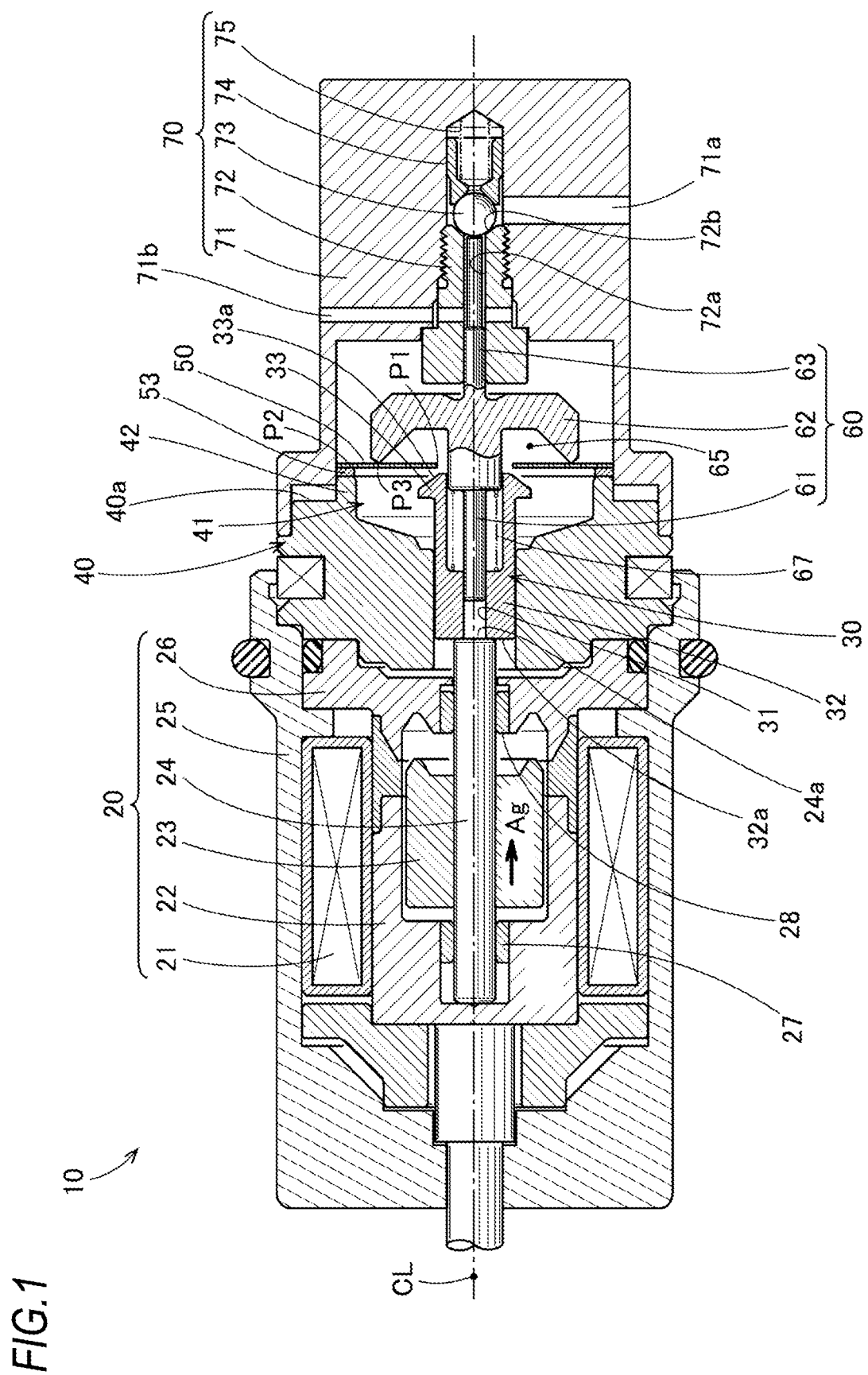
FIG. 1 is a cross-sectional view for explaining a valve device 10.

The valve device 10 according to a first embodiment will be described with reference to FIGS. 1 to 7. As depicted in FIG. 1, a valve device 10 is a coaxial direct acting valve that includes an operating unit 20, a first pushing member 30, a plate-like member 50, a second pushing member 60, and a valve 70 as main components.

It is preferable that the operating unit 20 is provided with an operating rod 24 capable of advancing and retracting (that is, sliding), and includes an electromagnetic solenoid. The electromagnetic solenoid 20 (operating unit 20) includes a push-type solenoid advancing a plunger 23 by exciting an exciting coil 21. Further, it is more preferable that the electromagnetic solenoid 20 is a so-called proportional solenoid in which the advancing distance of the plunger 23 is proportional to the current supplied to the exciting coil 21. With the configuration of the proportional solenoid, the opening degree of the valve 70 can be adjusted according to the advancing distance of the plunger 23.

Specifically, the electromagnetic solenoid 20 includes the exciting coil 21, a core 22 provided inside the exciting coil 21, the plunger 23 guided inside the core 22 to be capable of advancing and retracting, and the rod-shaped (including tubular) operating rod 24 connected to the plunger 23.

The exciting coil 21, the core 22, the plunger 23, and the operating rod 24 are housed in a solenoid housing 25. An opened one end of the solenoid housing 25 is closed with a lid 26. The operating rod 24 is supported by the core 22 and the lid 26 with bushes 27 and 28 (bearings 27 and 28). A front end 24a of the operating rod 24 in an advancing direction (arrow Ag direction) penetrates the lid 26.

The first pushing member 30, the plate-like member 50, the second pushing member 60, and the valve 70 are positioned on a center line CL of the operating rod 24. These members are arranged in the order of the first pushing member 30, the plate-like member 50, the second pushing member 60, and the valve 70 in a direction from the electromagnetic solenoid 20 toward the valve 70. In the second pushing member 60, a shaft 61, which will be described below, is disposed closer to the electromagnetic solenoid 20 side than the plate-like member 50, and an acted portion 62 and a push rod 63 are disposed closer to the valve 70 side than the plate-like member 50.

Figure 2:
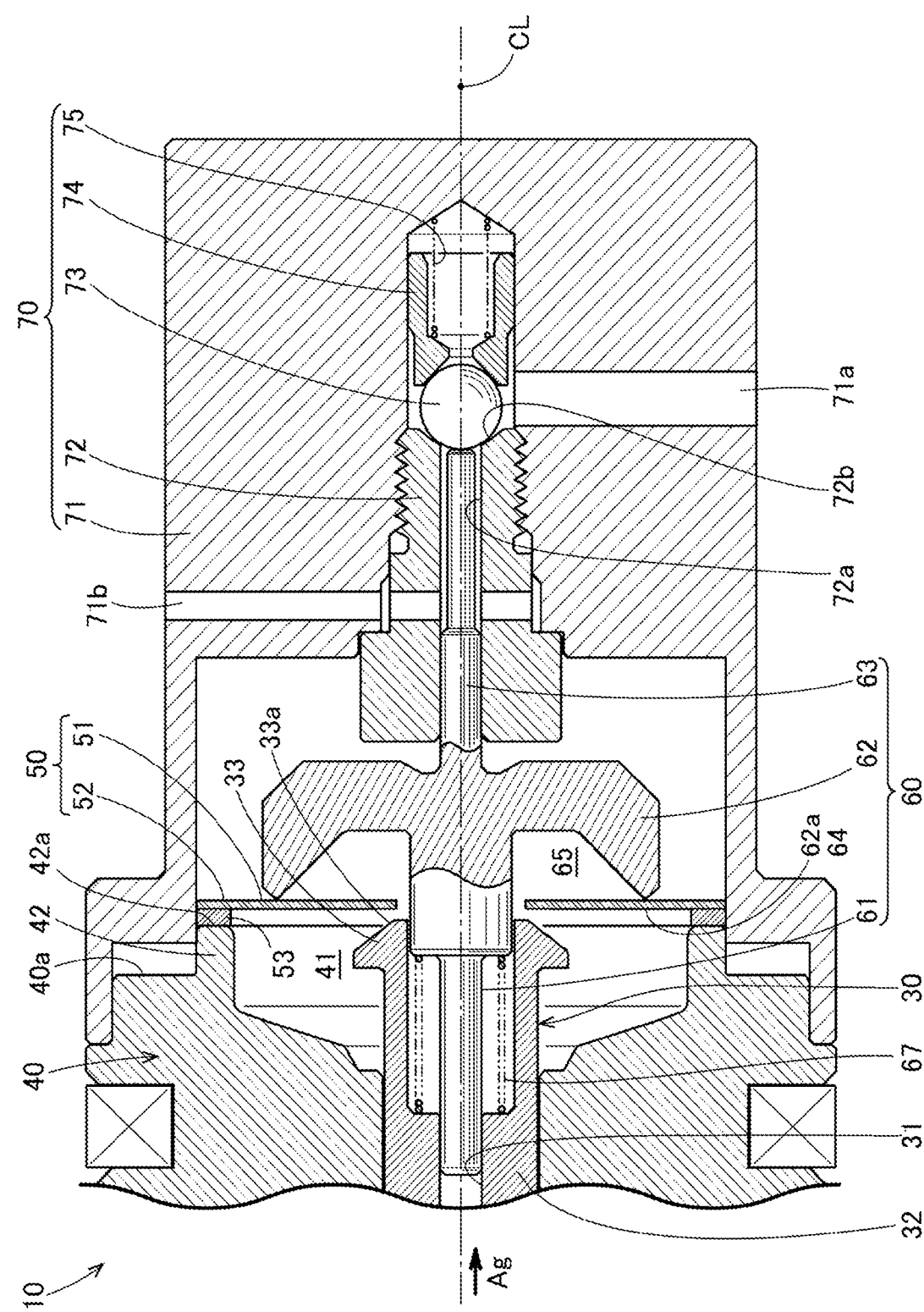
FIG. 2 is an enlarged view of a guide panel, a first pushing member, a plate-like member, a second pushing member, and a valve periphery of the valve device 10 depicted in FIG. 1.
Figure 3:
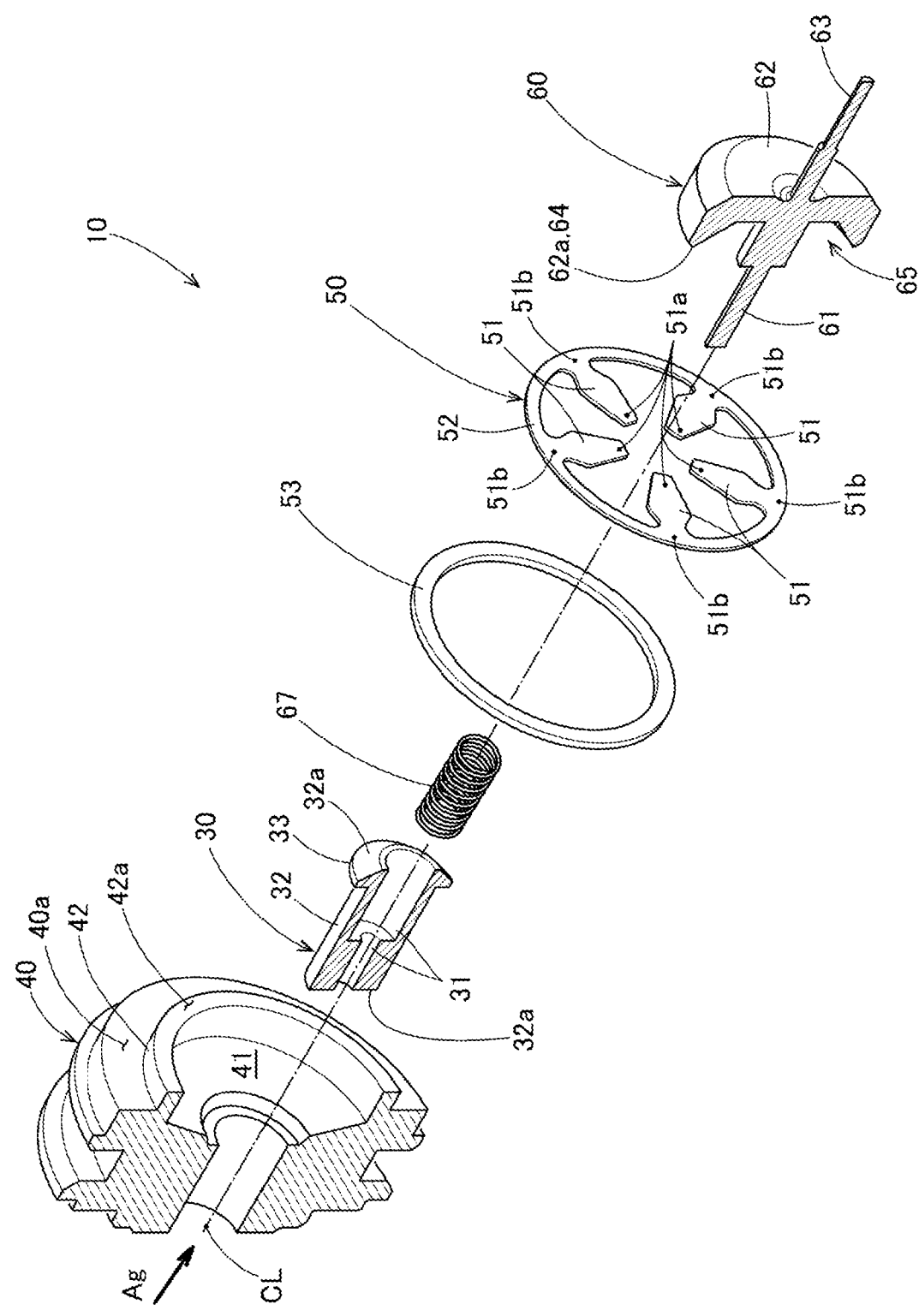
FIG. 3 is an exploded view of the guide panel, the first pushing member, the plate-like member, and the second pushing member depicted in FIG. 2.

As depicted in FIGS. 1 to 3, the first pushing member 30 is a cylindrical member capable of advancing in the same direction as the operating rod 24 by being pushed by the operating rod 24 that advances, and has a through-hole 31 penetrating the axial center CL (center line CL of operating rod 24). Specifically, the first pushing member 30 includes a cylindrical main body 32 and a circular flange-shaped pushing portion 33 integrally formed at the front end of the main body 32.

Figure 7:
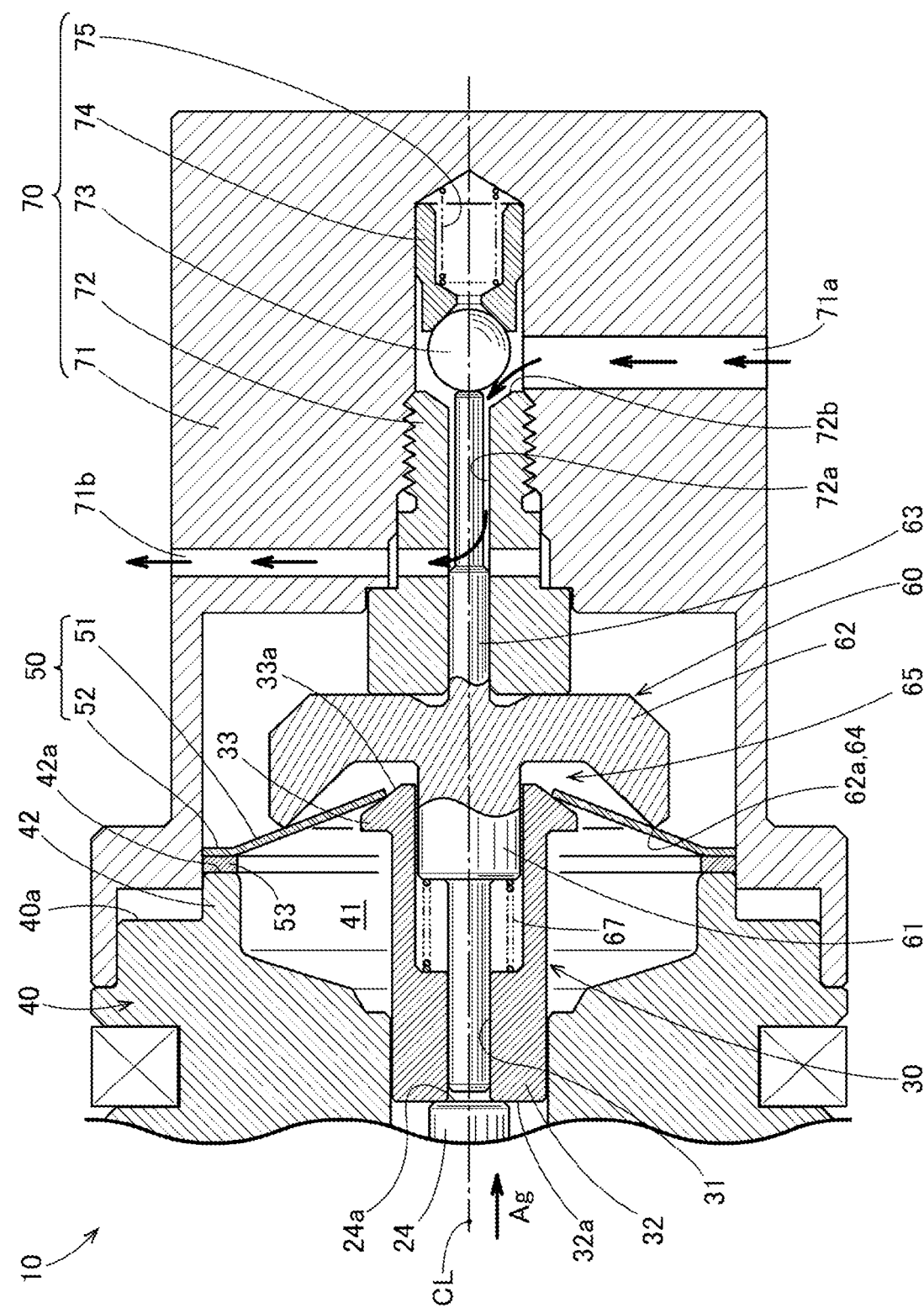
FIG. 7 is an operation diagram of the valve device 10 depicted in FIG. 2.

In the configuration depicted in FIGS. 1, 2 and 7, a rear end surface 32a of the main body 32 is in contact with the front end surface 24a of the operating rod 24 to be capable of being pushed by the front end surface 24a. The main body 32 is supported by the guide panel 40 to be capable of advancing and retracting in the axial direction of the first pushing member 30.

A front end surface 33a of the pushing portion 33 (front end 33) is a male tapered surface having a tapered shape. The front end surface 33a of the pushing portion 33 is not limited to the male tapered surface, and may be a convex or concave curved surface, for example. As described above, the front end surface 33a of the pushing portion 33 is preferably a male tapered surface or a curved surface. The reason will be described below.

As depicted in FIGS. 1 and 2, the guide panel 40 overlaps an end surface (the surface on a side opposite to the electromagnetic solenoid 20) of the lid 26 and is attached to the solenoid housing 25. In an end surface 40a (the surface 40a on a side opposite to the electromagnetic solenoid 20) of the guide panel 40, a recess 41 recessed from the end surface 40a and a support portion 42 protruding from the end surface 40a is provided. The recess 41 is a circular indentation having the center line CL of the operating rod 24 as a reference. The size of the diameter and the depth of the recess 41 are set so as not to interfere with the advancing and retracting motion of the pushing portion 33. The support portion 42 is a conical portion surrounding an edge of the recess 41 and extends toward the side opposite to the electromagnetic solenoid 20. An end surface 42a (front end surface 42a) of the support portion 42 is a flat surface orthogonal to the center line CL of the operating rod 24.

Figure 4:
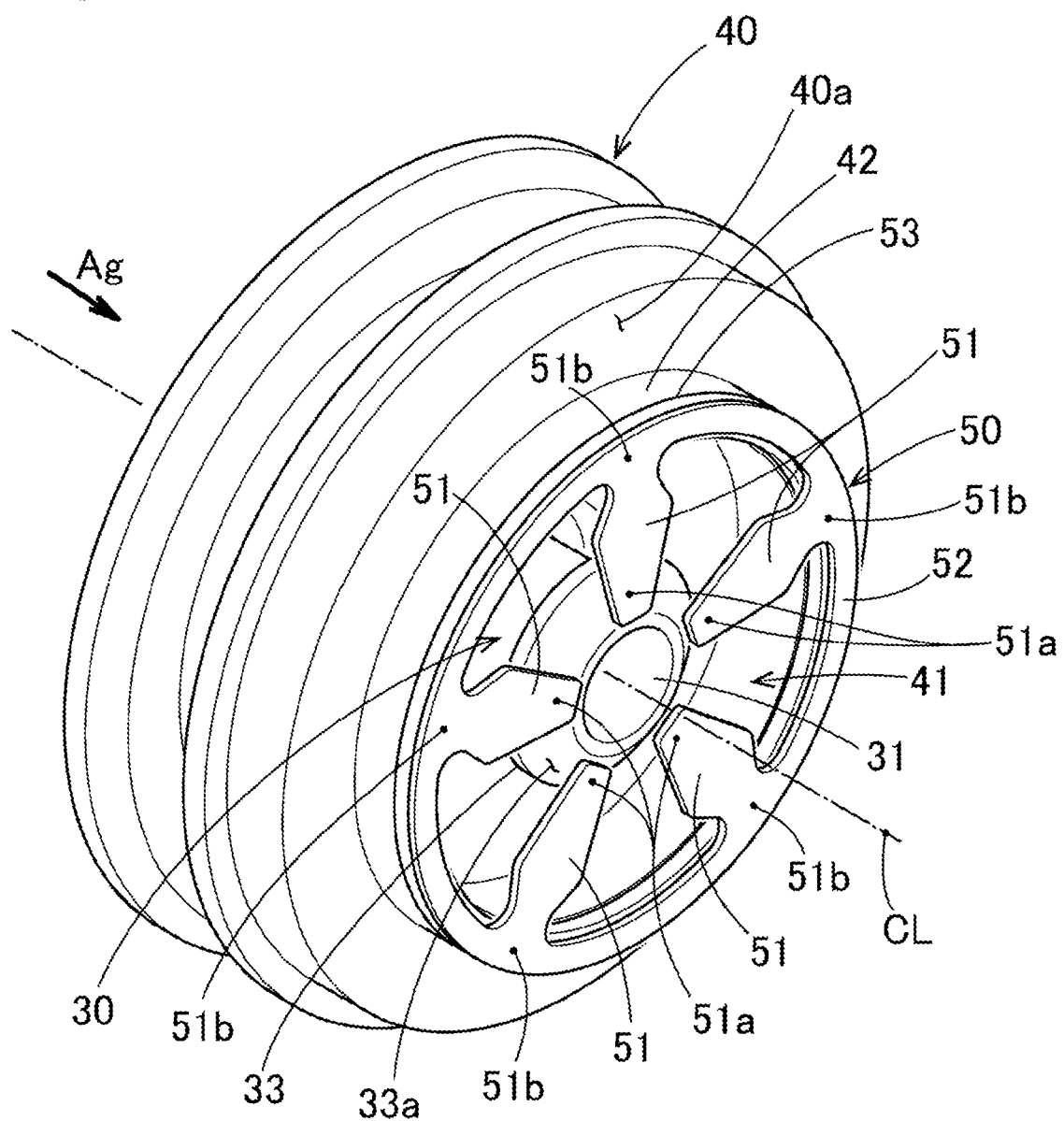
FIG. 4 is a perspective view of a configuration in which the guide panel, the first pushing member, and the plate-like member depicted in FIG. 2 are combined.

As depicted in FIGS. 3 and 4, the plate-like member 50 is formed in a flat plate shape using a plate-shaped elastic body (for example, a steel plate of spring steel). The plate surface of the plate-like member 50 faces the front end surface 33a of the pushing portion 33 and the end surface 42a of the support portion 42. More specifically, the plate-like member 50 includes at least one (more preferably, a plurality of) moment arm(s) 51 and an annular frame portion 52. FIGS. 1 to 9 depicted the plate-like member 50 including the plurality of moment arms 51.

Referring also to FIG. 2, the plurality of moment arms 51 are elongated in a direction intersecting an axial direction of the first pushing member 30, that is, in a direction orthogonal to the center line CL of the operating rod 24. The plurality of moment arms 51 are arranged at intervals in a circumferential direction at equal pitches, and integrally connected by the frame portion 52.

Figure 5:
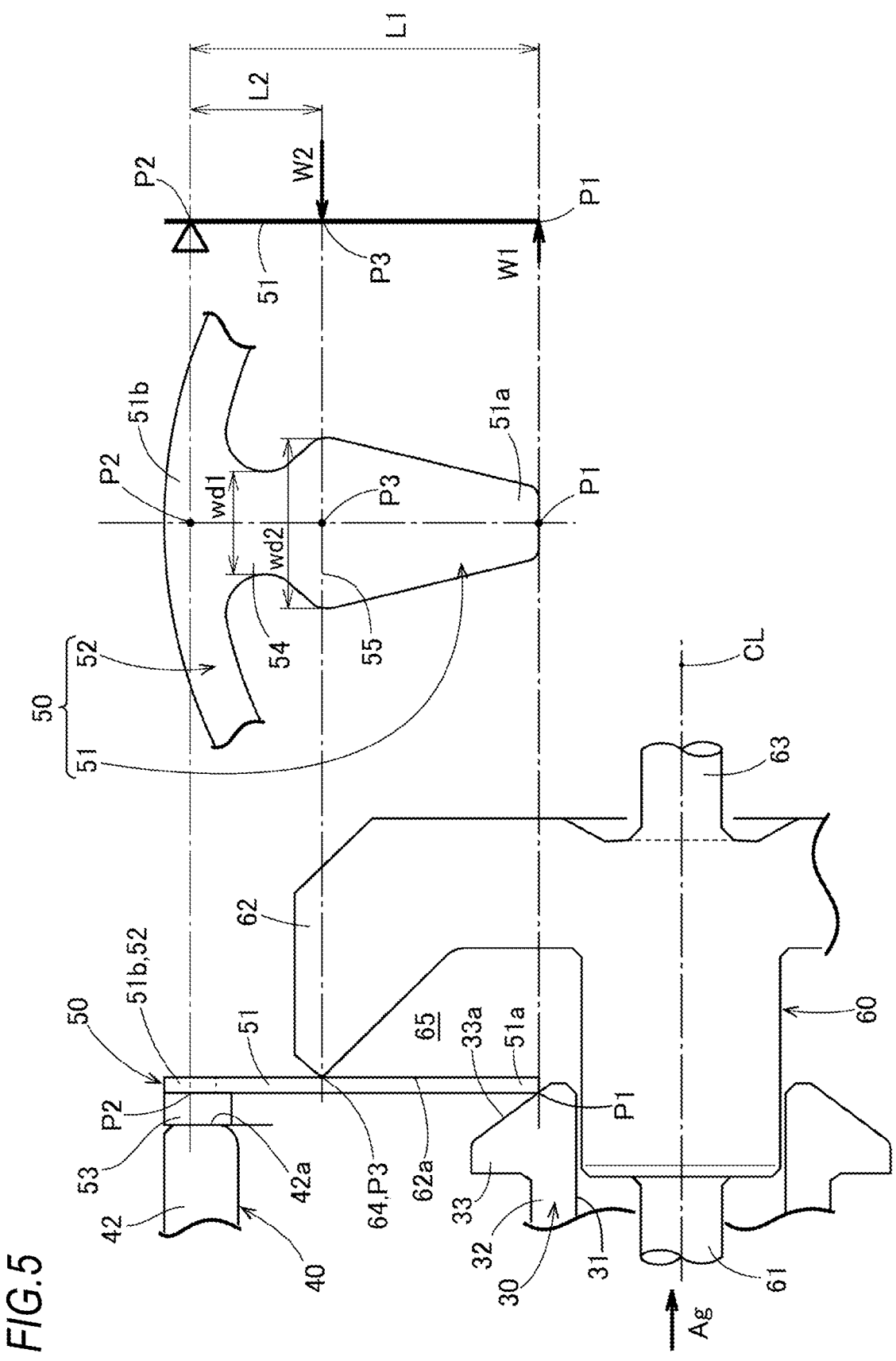
FIG. 5 is an explanatory view depicting a relationship among the guide panel, the first pushing member, the plate-like member, and the second pushing member depicted in FIG. 2.

An important point of the present invention is that each moment arm 51 utilizes the principle of "lever". That is, as depicted in FIG. 5, each moment arm 51 has a force point P1 at a first end 51a (hereinafter referred to as "one end 51a") on the axial center CL side (center line CL side) of the first pushing member 30, has a fulcrum P2 at a second end 51b (hereinafter referred to as "the other end 51b") on the side different from the axial center CL, and has an action point P3 between the force point P1 and the fulcrum P2 (between the force point P1 and the fulcrum P2, and on a back surface side of the force point P1 and the fulcrum P2). In this way, each moment arm 51 configures a mechanical booster mechanism utilizing the principle of "lever".

The one end 51a of the moment arm 51 faces the front end surface 33a of the pushing portion 33 to be capable of being pushed by the male tapered front end surface 33a. A point on the one end 51a of the moment arm 51, which is pushed by the front end surface 33a of the pushing portion 33 of the first pushing member 30, is the force point P1. Each moment arm 51 has one force point P1.

The other end 51b of the moment arm 51 is supported by the end surface 42a of the support portion 42 directly or via a flat washer 53. A point of the other end 51b of the moment arm 51, which is supported by the end surface 42a of the support portion 42, is the fulcrum P2. The frame portion 52 connects portions of the plurality of moment arms 51 where the fulcrum P2 is disposed.

The action point P3 is a point at which the force received at the force point P1 is increased and applied to the second pushing member 60 (pushing the second pushing member 60).

A distance (first distance) from the fulcrum P2 to the force point P1 is L1. A distance (second distance) from the fulcrum P2 to the action point P3 is L2, which is shorter than the first distance L1 (L2<L1). Here, a force (input) acting on the force point P1 is W1, and a force (acting force) acting on the action point P3 is W2. The formula of "L1×W1=L2×W2" is established based on the principle of "lever". Since W2=W1×(L1/L2) and (L1/L2)>1 are satisfied, the acting force W2 can be increased with respect to the input W1. That is, a large acting force W2 can be obtained with a small operating force W1.

In the plate-like member 50, a width Wd1 of a portion 54 where the frame portion 52 and the plurality of moment arms 51 are connected is narrower than a width Wd2 of a portion 55 where the action point P3 is disposed.

The second pushing member 60 is positioned on a side opposite to the first pushing member 30 with respect to the plate-like member 50, and can be advanced in the same direction as the first pushing member 30 by receiving a force from the action point P3 of each moment arm 51.

Figure 6:
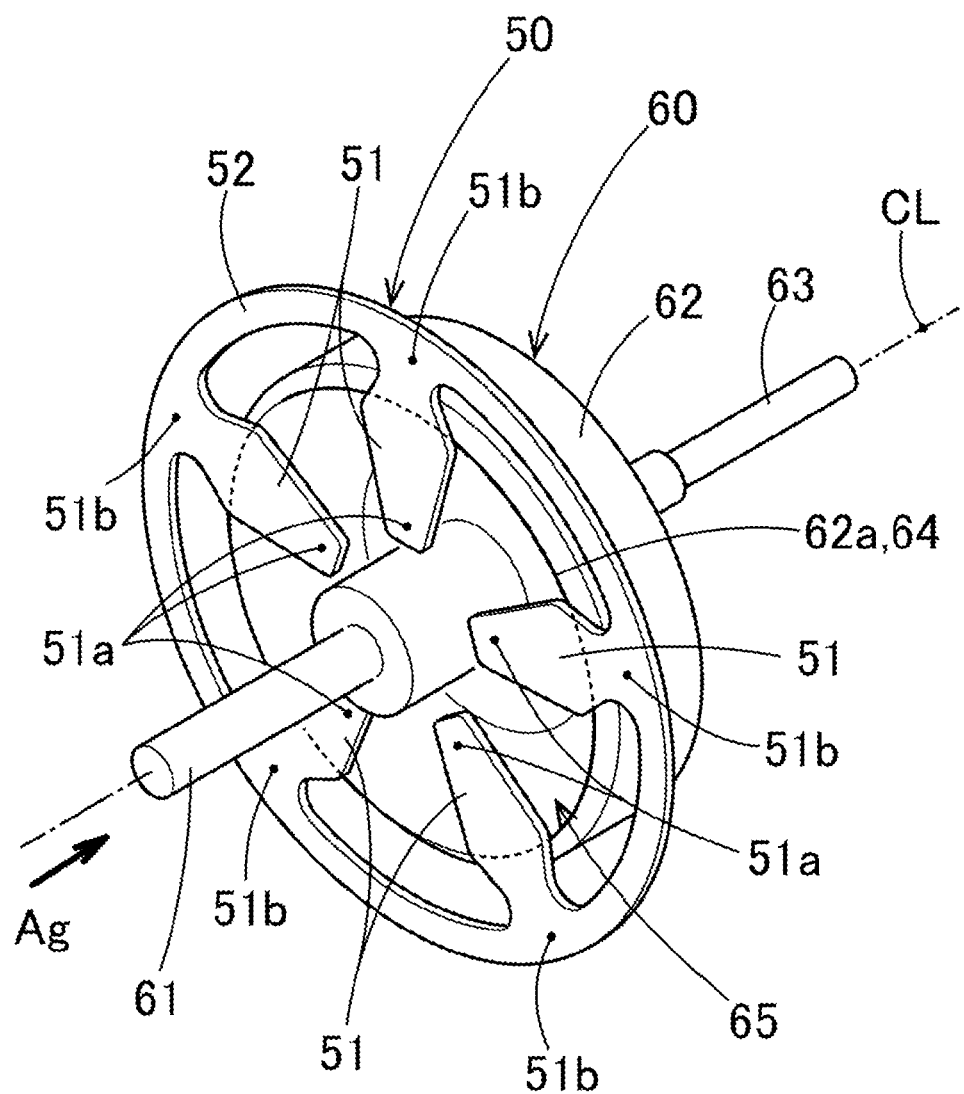
FIG. 6 is a perspective view of a configuration in which the plate-like member and the second pushing member depicted in FIG. 2 are combined.

Specifically, as depicted in FIGS. 2, 5 and 6, the second pushing member 60 includes the shaft 61 supported in the through-hole 31 of the first pushing member 30 to be capable of advancing and retracting, and the disk-shaped acted portion 62 integrally provided at a front end of the shaft 61, and the push rod 63 extending from the acted portion 62 toward the side opposite to the first pushing member 30. The shaft 61, the acted portion 62, and the push rod 63 are positioned on the center line CL of the operating rod 24, and formed integrally, or integrated by connecting the individual members.

On a facing surface 62a of the acted portion 62 facing the plurality of moment arms 51, an acted surface 64 and an interference preventing recess 65 are provided.

The acted surface 64 is a surface that receives a force from each of the action points P3 of the plurality of moment arms 51, and is a circular annular surface having the center line CL of the operating rod 24 as a reference. It is preferable that this annular acted surface 64 is a surface that intersects the axial direction of the first pushing member 30 (a surface that is orthogonal to the center line CL of the operating rod 24), that is, a surface parallel to the plurality of moment arms 51 so as to be uniformly brought into contact with each of the action points P3. Further, it is preferable that the cross section of the annular acted surface 64 has a tapered shape that is tapered as it approaches the action point P3 so as to ensure accurate positioning of the contact point with each action point P3.

The interference preventing recess 65 is recessed from the facing surface 62a. Each moment arm 51 that receives the force at the force point P1 is elastically deformed toward the facing surface 62a of the second pushing member 60. The interference preventing recess 65 is provided in the facing surface 62a, so that the facing surface 62a does not interfere with each elastically deformed moment arm 51. By the presence of the interference preventing recess 65, each moment arm 51 can be easily elastically deformed even though each moment arm 51 is adjacent to the facing surface 62a.

Hereinafter, the reason why it is preferable that the front end surface 33a of the pushing portion 33 of the first pushing member 30 depicted in FIG. 5 is formed as a male tapered surface or a curved surface will be described.

First, it is assumed that the front end surface 33a is a plane along the surface of the moment arm 51. In this case, the front end surface 33a advanced in the advancing direction of the operating rod 24 (arrow Ag direction) is brought into surface contact with the surface of the moment arm 51. In this case, as the moment arm 51 pushed by the front end surface 33a is bent, the position of the force point P1 changes to the outside in a radial direction of the front end surface 33a (the direction away from the center line CL). Therefore, the force acting on the action point P3 tends to be small. That is, in such a form, it is difficult to sufficiently exhibit the effect of the booster mechanism.

On the other hand, in the present invention, the front end surface 33a of the pushing portion 33 is formed as a male tapered surface or a curved surface. Therefore, even when the moment arm 51 pushed by the front end surface 33a is bent, the position of the force point P1 may be prevented from changing. As a result, the force acting on the action point P3 can be maintained to be large. That is, the effect of the booster mechanism can be more sufficiently exhibited by forming the front end surface 33a into a male tapered surface or a curved surface. This is the reason why the front end surface 33a is formed as a male tapered surface or a curved surface.

In the present invention, although the front end surface 33a of the pushing portion 33 is formed as a male tapered surface or a curved surface from the viewpoint of ease of designing the first pushing member 30, the side of the second pushing member 60 may be formed as a male tapered surface or a curved surface.

As depicted in FIG. 2, the first pushing member 30 and the second pushing member 60 may be biased by a biasing member 67 formed of a compression coil spring in a direction in which the pushing members are axially separated from each other.

As depicted in FIGS. 1 and 2, the push rod 63 of the second pushing member 60 opens and closes the valve 70. Accordingly, the valve 70 can be opened and closed according to the advancing and retracting of the second pushing member 60. The valve 70 includes a valve housing 71, a valve seat 72, a valve body 73, a pressing member 74, and a biasing member 75.

The valve housing 71 is attached to the solenoid housing 25 directly or via the guide panel 40, and houses the plate-like member 50 and the second pushing member 60. Further, the valve housing 71 houses the valve seat 72, the valve body 73, the pressing member 74, and the biasing member 75, and includes a first port 71a and a second port 71b through which fluid can pass. For example, the first port 71a is an inlet of the fluid and the second port 71b is an outlet of the fluid. The second port 71b is positioned closer to the second pushing member 60 than the first port 71a.

The valve seat 72, the valve body 73, the pressing member 74, and the biasing member 75 have axial centers, respectively, positioned at the axial center CL (on the center line CL) of the first pushing member 30 and are arranged in this order in the advancing direction of the second pushing member 60.

The valve seat 72 is a hollow member that can be screwed into the valve housing 71, and has a flow path 72a penetrating in an axial direction and a bearing surface 72b. The bearing surface 72b is a female tapered surface formed on an end surface on a side opposite to the second pushing member 60. The flow path 72a penetrates the valve seat 72 in the axial direction, also penetrates the valve seat 72 in the radial direction toward the second port 71b, and penetrates the bearing surface 72b. The push rod 63 is disposed in the flow path 72a and is capable of advancing and retracting through the valve seat 72.

The valve body 73 is a member that opens and closes the valve seat 72, and is preferably spherical. The front end of the push rod 63 can push the valve body 73 against the valve seat 72. The pressing member 74 presses the valve body 73 to the valve seat 72 by a biasing force of the biasing member 75 such as a compression coil spring.

Next, the operation of the valve device 10 will be described. As depicted in FIG. 1, when the exciting coil 21 of the electromagnetic solenoid 20 is not energized, the plunger 23 and the operating rod 24 are in the retracted position. Accordingly, the push rod 63 does not push the valve body 73. The valve body 73 is pressed against the valve seat 72 by the pressing member 74 and the biasing member 75. As a result, the valve 70 is closed.

After that, when the exciting coil 21 is energized, a magnetic force generated by the exciting coil 21 causes the plunger 23 and the operating rod 24 to advance (advance in the arrow Ag direction). The advancing operating rod 24 pushes the first pushing member 30 and advances the first pushing member 30 toward the plate-like member 50. As depicted in FIG. 5, the front end surface 33a of the pushing portion 33 of the first pushing member 30 pushes the force point P1 of each moment arm 51. Each moment arm 51 with the force point P1 pressed is elastically deformed and pushes the acted surface 64 of the second pushing member 60 with the action point P3. When the second pushing member 60 is pushed in this way, as depicted in FIG. 7, the front end of the push rod 63 of the second pushing member 60 pushes the valve body 73 against the biasing force of the biasing member 75. As a result, the valve 70 opens, and the first port 71a and the second port 71b get connected via the flow path 72a. Therefore, the fluid supplied to the first port 71a is discharged from the second port 71b through the flow path 72a.

After that, as depicted in FIG. 1, when the energization of the exciting coil 21 is stopped, the force for pushing the second pushing member 60 disappears, so that the push rod 63 is retracted by the biasing force of the biasing member 75. As a result, the valve 70 closes, and the second pushing member 60, each moment arm 51 (see FIG. 2), the operating rod 24, and the plunger 23 return to original retracted positions thereof.

The description of the valve device 10 according to a first embodiment is summarized as follows.

As depicted in FIGS. 1 to 7, the valve device 10 includes the operating unit 20 including the operating rod 24 capable of advancing and retracting motion, the first pushing member 30 capable of advancing in the same direction as the operating rod 24 by being pushed by the operating rod 24 that advances, the plate-like member 50 including at least one moment arm 51 that extends in a direction intersecting the axial direction of the first pushing member 30, has the force point P1 pushed by the first pushing member 30 at the first end 51a which is an end on the axial center CL side of the first pushing member 30, has the fulcrum P2 at the second end 51b which is an end on a side different from the axial center CL, and has the action point P3 between the force point P1 and the fulcrum P2, the second pushing member 60 capable of advancing in a same direction as the first pushing member 30 by receiving a force from the action point P3 of the moment arm 51, and the valve 70 capable of opening and closing according to the advancing and retracting motion of the second pushing member 60.

As described above, the principle of "lever" can be adopted by using the moment arm 51 having the force point P1, the fulcrum P2, and the action point P3. A mechanical booster mechanism that utilizes the principle of "lever" is adopted, so that a simple configuration without using a pilot valve can allow a large valve 70 to be opened and closed with a small operating force.

Further, as depicted in FIGS. 3 to 6, the plate-like member 50 includes the plurality of the moment arms 51 arranged at intervals in the circumferential direction, the force point P1 of each of the plurality of the moment arms 51 is pushed by the front end 33 (pushing portion 33) of the first pushing member 30, and the second pushing member 60 has the acted surface 64 receiving the force from the action point P3 of each of the plurality of the moment arms 51.

As a result, it is possible to perform stable valve operation in which the force point P1 and the action point P3 are not biased in the circumferential direction.

Further, as depicted in FIGS. 3 and 5, the plurality of moment arms 51 are integrally connected by the annular frame portion 52 of the plate-like member 50. on which the fulcrum P2 is disposed. As a result, each moment arm 51 can be positioned accurately by integrating the plurality of moment arms 51.

Further, as depicted in FIGS. 3 and 5, in the plate-like member 50, the width Wd1 of the portion 54 where the frame portion 52 and the plurality of moment arms 51 are connected is narrower than the width Wd2 of the portion 55 where the action point P3 is disposed.

Therefore, the moment arm 51 has a spring property (spring component). As depicted in FIG. 1, the thrust of the operating unit 20 is transferred to the valve 70 through the spring property of the moment arm 51. Accordingly, it is possible to arbitrarily set a relatively large "spring constant". Moreover, it is possible to separate the opening and closing motion characteristics of the valve 70 from the mass on the operating unit 20 side. Therefore, it is possible to obtain a valve opening characteristic with high responsiveness to slight pressure variations at the inlets and outlets 71a and 71b (the first port 71a and the second port 71b) of the valve 70 and variations in the thrust of the operating unit 20.

Further, as depicted in FIGS. 1 and 7, the plate-like member 50 is an elastic body. Accordingly, the moment arm 51 is easy to be elastically deformed in the direction of the center line CL of the operating rod 24, so that it is possible to smoothly open and close the valve 70.

Further, as depicted in FIG. 1, the operating unit 20 is an electromagnetic solenoid. Accordingly, it is possible to formed the operating unit 20 with the operating rod 24 advancing and retracting with a relatively simple configuration.

The frame portion 52 (see FIG. 3) of the above valve device 10 may have any configuration in which the plurality of moment arms 51 are connected to each other. For example, as in Modification 1 depicted in FIG. 8, the frame portion 52 may be configured to connect the one ends 51a of the plurality of moment arms 51 to each other. Further, as in Modification 2 depicted in FIG. 9, the frame portion 52 may be configured to connect the middle portions of the plurality of moment arms 51 in longitudinal direction to each other.

Next, the valve device 10A according to a second embodiment will be described with reference to FIGS. 10 to 12 and FIG. 5 described above.

Second Embodiment

Figure 10:
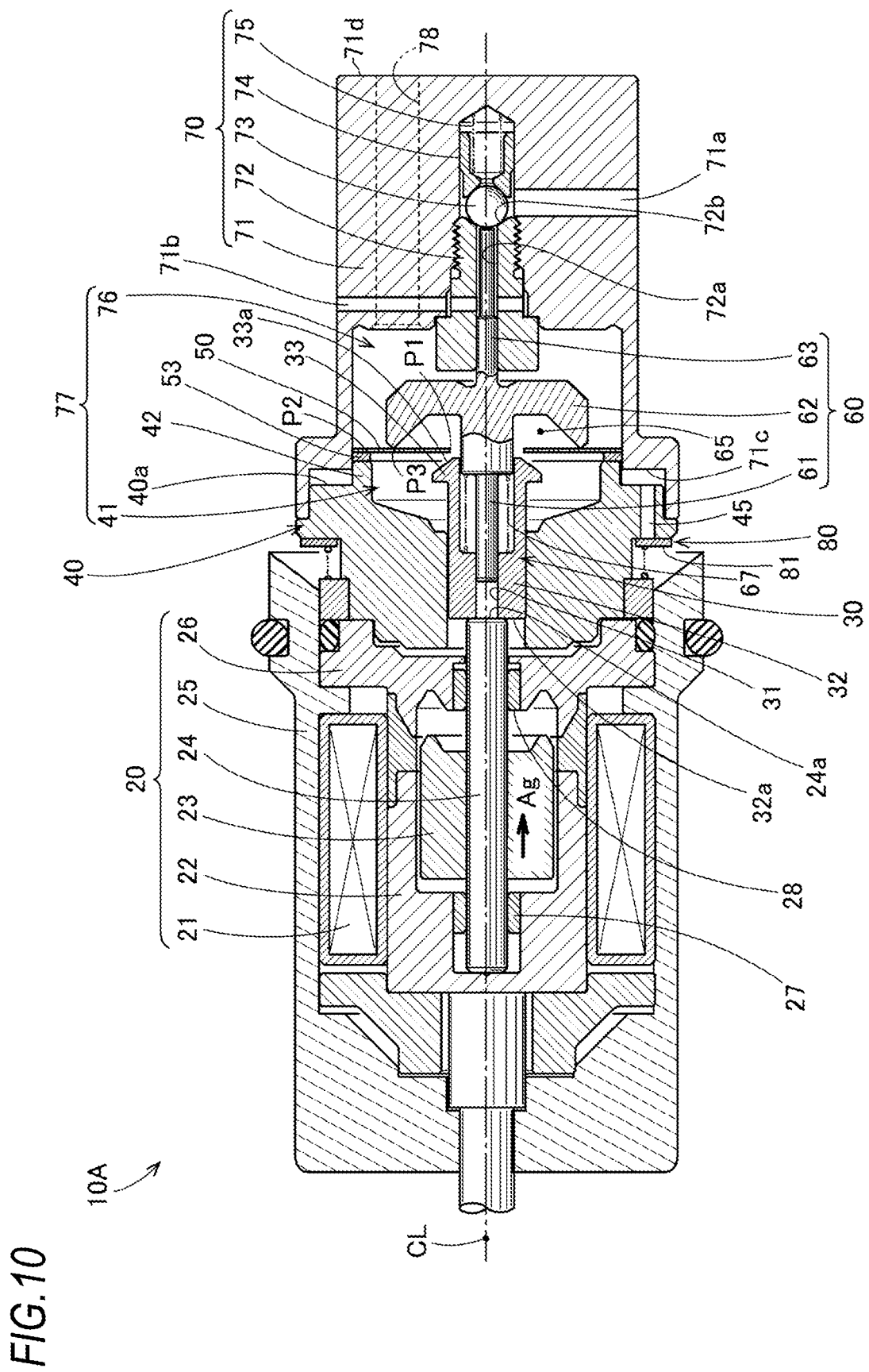
FIG. 10 is a cross-sectional view for explaining a valve device 10A.
Figure 11:
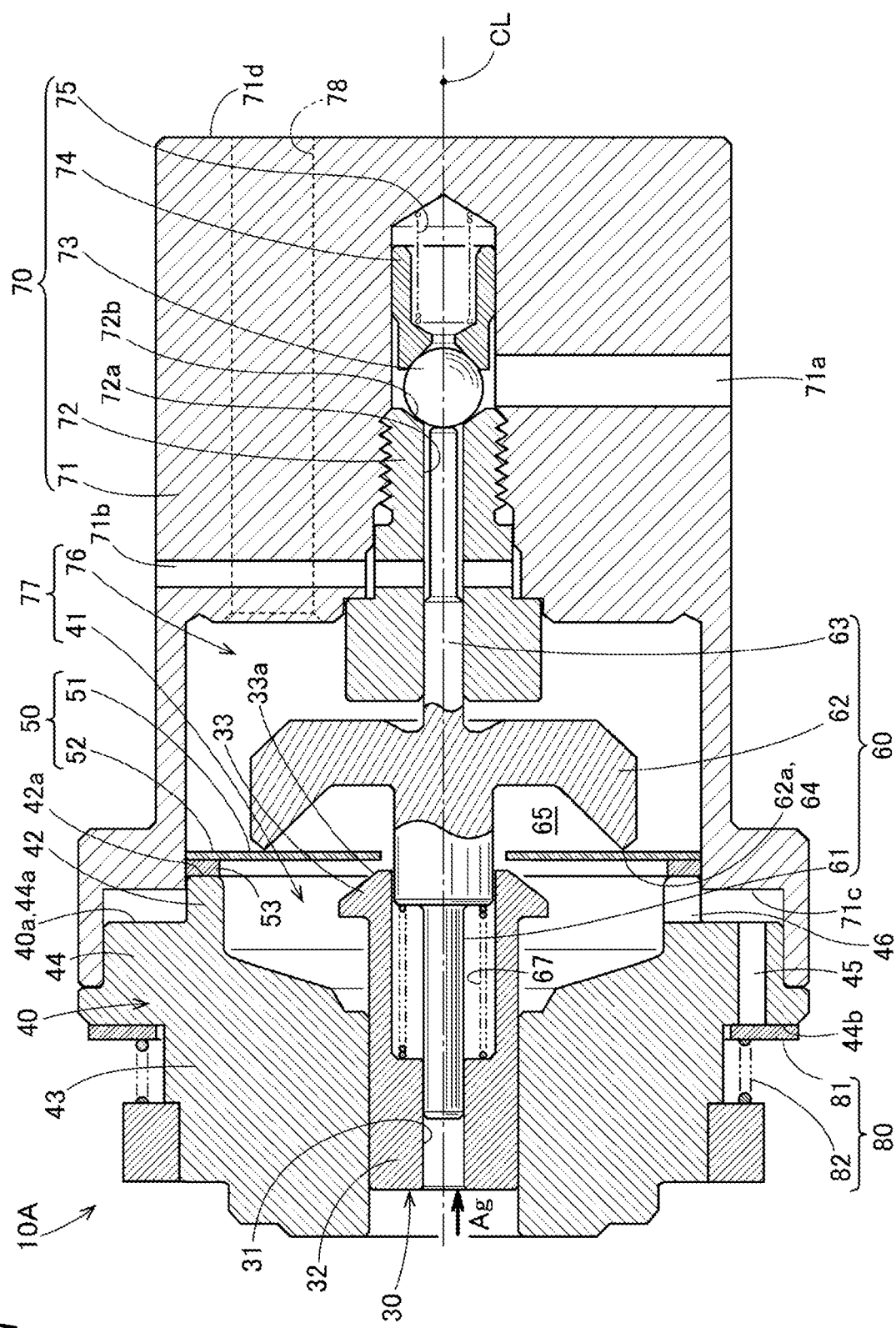
FIG. 11 is an enlarged view of the guide panel, the first pushing member, the plate-like member, the second pushing member, the valve, and the check valve periphery of the valve device 10A depicted in FIG. 10.
Figure 12:
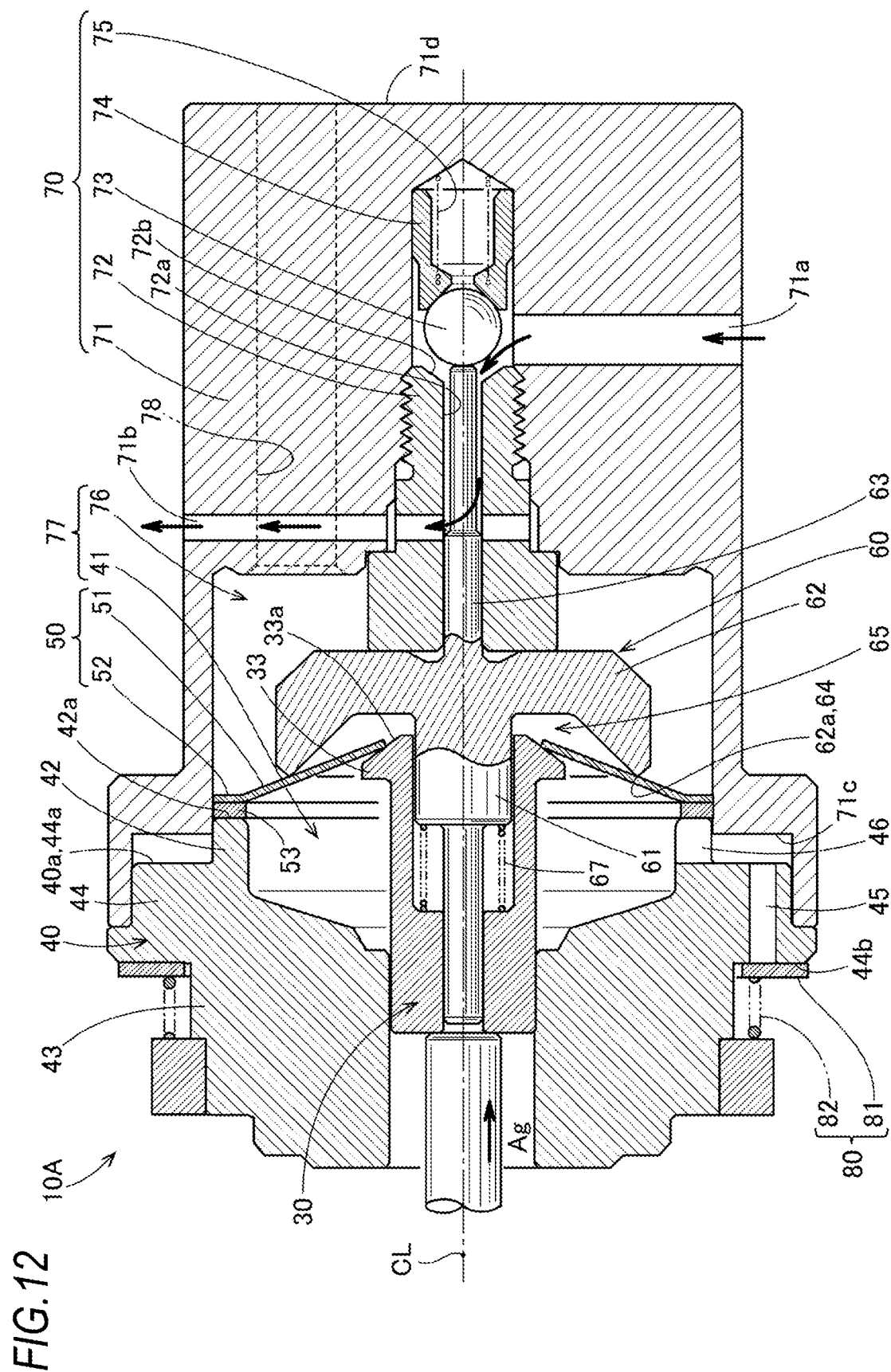
FIG. 12 is an operation diagram of the valve device 10A depicted in FIG. 11.

FIG. 10 is an illustration correspondence to FIG. 1 described above, depicting a cross-sectional structure of the valve device 10A. FIG. 11 is an illustration corresponding to FIG. 2 described above. FIG. 12 is an illustration corresponding to FIG. 7 described above. In addition, FIG. 5 described above is used as it is.

The valve device 10A depicted in FIG. 10 is characterized by the following three changes from the valve device 10 described above. The first change is a partial change in the configuration of the guide board 40 (see FIGS. 11 and 12). The second change is that a storage chamber 77, including the recess 41 of the guide board 40 and the recess 76 of the valve housing 71, is in communication with the outside of the valve housing 71 through a communication hole 45 (see FIG. 11). The third change is the inclusion of a check valve 80 that is opened when the internal pressure of the storage chamber 77 exceeds the external pressure (see FIG. 11). When the pressure of the storage chamber 77 closed by the check valve 80 exceeds the pressure of a space arranged on the opposite side of the storage chamber 77 across the check valve 80 interposed therebetween, the check valve 80 opens. Other basic configurations are the same as those of the valve device 10 depicted in FIGS. 1 to 9. The same elements as those of the valve device 10 described above will be denoted by the same reference numerals, and the detailed description thereof will be omitted.

The plate-like member 50 of the valve device 10A includes a plurality of moment arms 51 arranged at intervals in the circumferential direction with the center line CL of the operating rod 24 serving as a reference (FIGS. 3 and 5 above). More specifically, the plate-like member 50 of the valve device 10A includes three moment arms 51. From the viewpoint of easily increasing the durability of the plate-like member 50, the number of the moment arms 51 is more preferably 2 or 3.

As depicted in FIG. 11, the guide board 40 includes a cylindrical base portion 43 having the center line CL of the operating rod 24 (see FIG. 10) as a reference, and a disk-shaped flange 44 integrally formed on an outer peripheral surface of one end of the base portion 43 (the end on a side opposite to the electromagnetic solenoid 20 depicted in FIG. 10). The outer diameter of the flange 44 is greater than the outer diameter of the base portion 43. The end surface 40a of the guide board 40 is formed by the flange surface 44a of the flange 44. The recess 41 is provided in the base portion 43.

A first end surface 71c of the valve housing 71 faces the end surface 40a of the guide board 40 (the flange surface 44a of the flange 44) with a gap defined therebetween. The valve housing 71 includes a recess 76 that houses the plate-like member 50 and the second pushing member 60. The recess 76 is a columnar indentation having the center line CL of the operating rod 24 as a reference, and is connected to the recess 41 of the guide board 40. Hereinafter, the recess 41 of the guide board 40 and the recess 76 of the valve housing 71 are collectively referred to as the storage chamber 77. The storage chamber 77 houses the first pushing member 30, the plate-like member 50, and the second pushing member 60.

Further, the guide board 40 includes a plurality of communication holes 45 penetrating the flange 44 along the center line CL of the operating rod 24. Further, the support portion 42, which is annular in shape, includes a plurality of communication passages 46 communicating from the recess 41 in a radially outward direction of the support portion 42.

The check valve 80 (one-way valve 80) is arranged on a rear surface 44b of the flange 44 (the surface 44b of the flange 44 on the opposite side to the flange surface 44a). The check valve 80 includes a valve body 81 that opens and closes the plurality of communication holes 45, and a biasing member 82 that applies a force to the valve body 81 in a closing direction. The valve body 81 is formed by a ring-shaped flat plate that is loosely fitted around the base portion 43 of the guide board 40. The valve body 81 closes the plurality of communication holes 45 by overlapping the rear surface 44b of the flange 44. The biasing member 82 biases the valve body 81 toward the rear surface 44b of the flange 44, and is formed of a compression coil spring, for example.

The check valve 80 is not limited to the structure having the valve body 81 and the biasing member 82, and the valve body 81 itself can be formed of a leaf spring, for example. In that case, the biasing member 82 is unnecessary.

When the valve device 10A is in the state depicted in FIG. 11, the pressure (internal pressure) inside the storage chamber 77 acts on the valve body 81 of the check valve 80 through the communication passages 46 and the communication holes 45. When this internal pressure does not exceed the pressure outside the storage chamber 77 (pressure outside the valve device 10A), the valve body 81 closes the communication hole 45 by the biasing force of the biasing member 82. That is, the check valve 80 is maintained in the closed state.

The valve housing 71 includes a communication hole 78 through which the storage chamber 77 is in communication with the outside. The communication hole 78 is opened in the second end surface 71d of the valve housing 71 (the end surface 71d on the side opposite to the recess 76), and can be communicated with an external device (not depicted). High pressure such as hydraulic pressure can act on the storage chamber 77 from the external device through the communication hole 78.

When the internal pressure of the storage chamber 77 exceeds the pressure outside the storage chamber 77, the force that opens the valve body 81 exceeds the force applied by the biasing member 82 to close the valve body 81, and accordingly, the valve body 81 is opened. As described above, when the check valve 80 opens, the internal pressure of the storage chamber 77 is released to the outside.

The description of the valve device 10A is summarized as follows.

As depicted in FIGS. 10 to 12, and also in FIG. 5 described above, the valve device 10A includes:

an operating unit 20 including an operating rod 24 capable of advancing and retracting;

a first pushing member 30 capable of advancing in the same direction as the operating rod 24 by being pushed by the operating rod 24 that advances;

a plate-like member 50 including at least one moment arm 51 that extends in a direction intersecting an axial direction of the first pushing member 30, has a force point P1 pushed by the first pushing member 30 at a first end 51a which is an end on an axial center CL side of the first pushing member 30, has a fulcrum P2 at a second end 51b which is an end on a side different from the axial center CL, and has an action point P3 between the force point P1 and the fulcrum P2;

a second pushing member 60 capable of advancing in a same direction as the first pushing member 30 by receiving a force from the action point P3 of the moment arm 51, a valve 70 capable of opening and closing according to the advancing and retracting of the second pushing member 60;

a storage chamber 77 accommodating the first pushing member 30, the plate-like member 50 and the second pushing member 60; and a check valve 80 that is opened when the internal pressure of the storage chamber 77 exceeds the external pressure.

As described above, it is possible to adopt the principle of "lever" by using the moment arm 51 having the force point P1, the fulcrum P2, and the action point P3. By adopting a mechanical booster mechanism utilizing the principle of "lever", in a simple configuration without the pilot valve, it is possible to provide the valve device 10A capable of allowing the large valve 70 to be opened and closed with a small operating force.

Moreover, the valve device 10A includes the check valve 80 that is opened when the internal pressure of the storage chamber 77 exceeds the external pressure. Even when the inside of the storage chamber 77 is depressurized, the check valve 80 maintains in the closed state, and accordingly, air does not enter the storage chamber 77 from the outside of the valve device 10A even when the inside of the storage chamber 77 is depressurized. Even when the valve device 10A is attached to various devices (not depicted), the various devices are not affected by the air entering the storage chamber 77 from the outside of the valve device 10A. Therefore, according to the valve device 10A including the check valve 80, it is possible to sufficiently ensure the performance of the various devices.

As an example, it is possible to provide the valve device 10A in a shock absorber. The shock absorber is adopted in a front fork of a saddle-ride type vehicle, for example. In this case, the shock absorber is mounted on the saddle-ride type vehicle in a substantially vertical state so that the pump is located below the valve device 10A. The pump includes a cylinder, a rod, and a piston of the shock absorber, and pressurizes and/or depressurizes the inside of the oil chamber. The oil chamber communicates with the storage chamber 77 through the communication hole 78 of the valve device 10A. When the shock absorber is at the extension stroke, the pump sucks oil by depressurizing the inside of the storage chamber 77 and the oil chamber. The valve device 10A included in the shock absorber includes the check valve 80. When the insides of the storage chamber 77 and the oil chamber are depressurized, the check valve 80 is closed, and accordingly, the outside air does not enter the oil chamber through the depressurized storage chamber 77. Accordingly, when the shock absorber transitions from the extension stroke to the compression stroke, the pump can sufficiently pressurize the oil in the oil chamber. As a result, it is possible to sufficiently ensure the performance of the pump.

Further, as depicted in FIG. 11, and also FIGS. 5 and 6 described above, the plate-like member 50 includes a plurality of the moment arms 51 arranged at intervals in the circumferential direction, the force point P1 of each of the plurality of the moment arms 51 is pushed by the front end 33 (pushing portion 33) of the first pushing member 30, and the second pushing member 60 includes the acted surface 64 receiving the force from the action point P3 of each of the plurality of the moment arms 51.

As a result, it is possible to perform a stable valve operation, in which the force point P1 and the action point P3 are not biased in the circumferential direction.

Further, as depicted in FIG. 5 described above, the plurality of the moment arms 51 are integrally connected by the annular frame portion 52 of the plate-like member 50, the fulcrum P2 being disposed on the annular frame portion 52. As a result, it is possible to accurately set the position of each moment arm 51 by integrating the plurality of moment arms 51.

Further, as depicted in FIG. 5 described above, in the plate-like member 50, the width Wd1 of the portion 54 where the frame portion 52 and the plurality of the moment arms 51 are connected is narrower than the width Wd2 of the portion 55 where the action point P3 is disposed.

Therefore, the moment arm 51 has a spring property (spring component). As depicted in FIG. 10, the thrust of the operating unit 20 is transferred to the valve 70 through the spring property of the moment arm 51. Accordingly, it is possible to arbitrarily set a relatively large "spring constant". Moreover, it is possible to separate the opening and closing motion characteristics of the valve 70 from the mass on the operating unit 20 side. Therefore, it is possible to obtain a valve opening characteristic with high responsiveness to slight pressure variations at the inlets and outlets 71a and 71b (the first port 71a and the second port 71b) of the valve 70 and variations in the thrust of the operating unit 20.

Further, as depicted in FIGS. 10 and 12, the plate-like member 50 is an elastic body. Accordingly, the moment arm 51 is easy to be elastically deformed in the direction of the center line CL of the operating rod 24, so that it is possible to smoothly open and close the valve 70.

Further, as depicted in FIG. 10, the operating unit 20 is an electromagnetic solenoid. Accordingly, it is possible to form the operating unit 20, which the operating rod 24 advances and retracts, with a relatively simple configuration.

It should be noted that the valve devices 10, 10A according to the present invention is not limited to the above embodiment as long as the effects and advantages of the present invention are exhibited.

Figure 8:
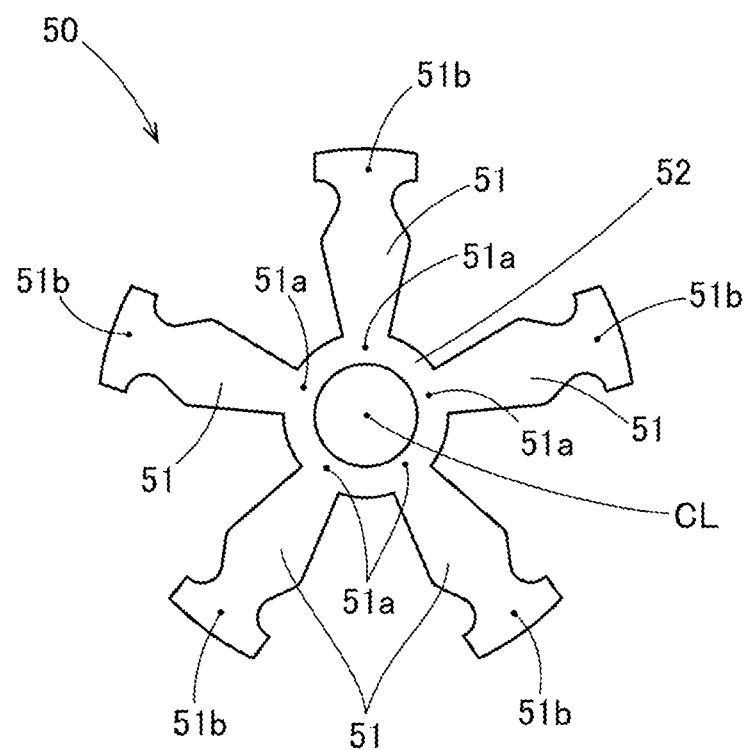
FIG. 8 is a diagram depicting Modification 1 of the plate-like member depicted in FIG. 3 when viewed in the axial direction.
Figure 9:
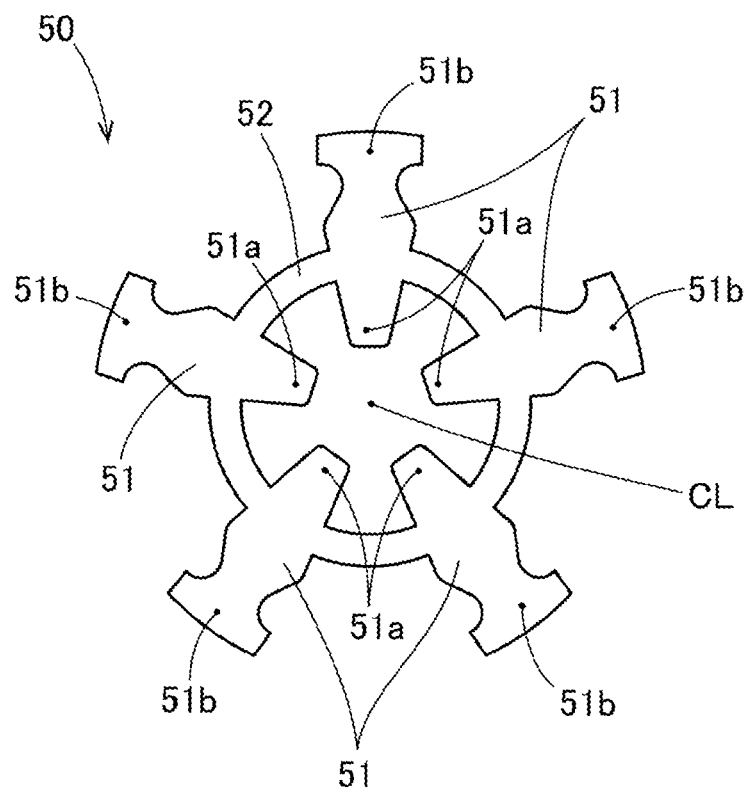
FIG. 9 is a diagram depicting Modification 2 of the plate-like member depicted in FIG. 3 when viewed in the axial direction.

For example, it is possible to apply the configuration of the plate-like member 50 of the Modification 1 depicted in FIG. 8 and the configuration of the plate-like member 50 of the Modification 2 depicted in FIG. 9 to the plate-like member 50 of the valve device 10A of the second embodiment.

Further, it is possible to use the valve devices 10, 10A of the present invention for a front fork or a rear cushion of a saddle-ride type vehicle.

It is suitable for adopting the valve devices 10, 10A according to the present invention in a vehicle height adjustment device for a saddle-ride type vehicle having two or three wheels.

The invention claimed is:

1. A valve device comprising:
an operating unit including an operating rod capable of advancing and retracting;
a first pushing member capable of advancing in a same direction as the operating rod by being pushed by the operating rod that advances;
a plate-like member including at least one moment arm that extends in a direction intersecting an axial direction of the first pushing member, has a force point pushed by the first pushing member at a first end which is an end on an axial center side of the first pushing member, has a fulcrum at a second end which is an end on a side different from the axial center, and has an action point between the force point and the fulcrum;
a second pushing member capable of advancing in a same direction as the first pushing member by receiving a force from the action point of the moment arm; and
a valve capable of opening and closing according to advancing and retracting of the second pushing member,
wherein the plate-like member includes a plurality of the moment arms arranged at intervals in a circumferential direction,
the force point of each of the plurality of the moment arms is pushed by a front end of the first pushing member,
the second pushing member has an acted surface receiving a force from the action point of each of the plurality of the moment arms, and
the plurality of the moment arms are integrally connected by an annular frame portion of the plate-like member, the fulcrum being disposed on the annular frame portion.

2. The valve device according to claim 1,
wherein, in the plate-like member, a width of a portion where the frame portion and the plurality of the moment arms are connected is narrower than a width of a portion where the action point is disposed.

3. The valve device according to claim 2,
wherein the plate-like member is an elastic body.

4. The valve device according to claim 3,
wherein the operating unit is an electromagnetic solenoid.

5. The valve device according to claim 2,
wherein the operating unit is an electromagnetic solenoid.

6. The valve device according to claim 1,
wherein the plate-like member is an elastic body.

7. The valve device according to claim 6,
wherein the operating unit is an electromagnetic solenoid.

8. The valve device according to claim 1,
wherein the operating unit is an electromagnetic solenoid.

9. A valve device comprising:
an operating unit including an operating rod capable of advancing and retracting;
a first pushing member capable of advancing in a same direction as the operating rod by being pushed by the operating rod that advances;
a plate-like member including at least one moment arm that extends in a direction intersecting an axial direction of the first pushing member, has a force point pushed by the first pushing member at a first end which is an end on an axial center side of the first pushing member, has a fulcrum at a second end which is an end on a side different from the axial center, and has an action point between the force point and the fulcrum;
a second pushing member capable of advancing in a same direction as the first pushing member by receiving a force from the action point of the moment arm;
a valve capable of opening and closing according to advancing and retracting of the second pushing member;
a storage chamber accommodating the first pushing member, the plate-like member, and the second pushing member; and a check valve that is opened when an internal pressure of the storage chamber exceeds an external pressure, wherein the plate-like member includes a plurality of the moment arms arranged at intervals in a circumferential direction, the force point of each of the plurality of the moment arms is pushed by a front end of the first pushing member, the second pushing member includes an acted surface receiving the force from the action point of each of the plurality of the moment arms, and the plurality of the moment arms are integrally connected by an annular frame portion of the plate-like member, the fulcrum being disposed on the annular frame portion.

10. The valve device according to claim 9, wherein, in the plate-like member, a width of a portion where the frame portion and the plurality of the moment arms are connected is narrower than a width of a portion where the action point is disposed.

11. The valve device according to claim 10, wherein the plate-like member is an elastic body.

12. The valve device according to claim 11, wherein the operating unit is an electromagnetic solenoid.

13. The valve device according to claim 10, wherein the operating unit is an electromagnetic solenoid.

14. The valve device according to claim 9, wherein the plate-like member is an elastic body.

15. The valve device according to claim 14, wherein the operating unit is an electromagnetic solenoid.

16. The valve device according to claim 9, wherein the operating unit is an electromagnetic solenoid.

* * * * *